(12) United States Patent
Mou

(10) Patent No.: US 8,482,726 B2
(45) Date of Patent: Jul. 9, 2013

(54) RADIANCE MEASURING DEVICE

(75) Inventor: TongSheng Mou, Zhejiang (CN)

(73) Assignee: Hangzhou Zhejiang University Sensing Instruments Co., Ltd., Westlake District, Hangzhou, Zhejiang (CN)

( * ) Notice: Subject to any disclaimer, the term of this patent is extended or adjusted under 35 U.S.C. 154(b) by 245 days.

(21) Appl. No.: 13/002,924

(22) PCT Filed: Jul. 6, 2009

(86) PCT No.: PCT/CN2009/072653
§ 371 (c)(1),
(2), (4) Date: Jan. 6, 2011

(87) PCT Pub. No.: WO2010/003362
PCT Pub. Date: Jan. 14, 2010

(65) Prior Publication Data
US 2011/0116083 A1    May 19, 2011

(30) Foreign Application Priority Data
Jul. 7, 2008    (CN) .......................... 2008 1 0062957

(51) Int. Cl.
G01J 1/40    (2006.01)

(52) U.S. Cl.
USPC ......................................... 356/233

(58) Field of Classification Search
USPC ......................................... 356/233
See application file for complete search history.

(56) References Cited

U.S. PATENT DOCUMENTS 5,561,289 A * 10/1996 Yamada et al. ............... 250/221
6,556,284 B1   4/2003 Leroux

* cited by examiner

Primary Examiner — Tu Nguyen
(74) Attorney, Agent, or Firm — Global IP Services; Tianhua Gu

(57) ABSTRACT

A radiance measuring device comprises an imaging device, a light measuring device (2) and a connection seat (3) for connecting the imaging device with the light measuring device (2). The emission port of the imaging device corresponds to the incidence port of the light measuring device (2). The imaging device comprises an imaging lens (1-1) and an aperture diaphragm (1-2), and the aperture diaphragm (1-2) is located on the front focal plane of the imaging lens (1-1).

10 Claims, 3 Drawing Sheets

RADIANCE MEASURING DEVICE

CROSS REFERENCE TO RELATED PATENT APPLICATION

The present patent application is the US national stage of PCT/CN2009/072653 filed on Jul. 6, 2009, which claims the priority of the Chinese patent application No. 200810062957.3 filed on Jul. 7, 2008, that application is incorporated herein by reference.

FIELD OF THE INVENTION

The invention relates to an optical radiation measuring device, in particular to a radiance measuring device.

BACKGROUND OF THE INVENTION

With the development of various high-radiance light sources, in particular the universal application of light emitting diode (LED) in indication, display and lighting, the damage to human eyes caused by optical radiation has raised more and more attention. In recent years, some corresponding standard agencies have proposed the requirement of classification and grading of such perniciousness.

The test and evaluation of photo biological safety of light source requires the measurement of effective radiance on human retina in order to evaluate the optical radiation safety of the tested light source. The effective radiance of human retina is related to the size of pupil, the sensibility of retinal damage to different wavelengths, spectral characteristics of light sources, duration and other characteristics of human eyes' observation on light sources, and luminous distribution of the surface of light sources.

The existing luminance meters include luminance meter, spectral luminance meter and imaging luminance meter. All of the three types of luminance meter are equipped with imaging optical lens, which will image the luminance signal of the target to the corresponding photoelectric detection instruments. The luminance meter and the spectral luminance meter respectively apply the photoelectric detector with a spectral response of the spectral luminous efficiency function $V(\lambda)$ and spectroradiometer; the former can only read luminance value, and cannot acquire radiance and other parameters, while the latter can acquire the corresponding effective radiance to the optical damage on human retina through computer software. The imaging luminance meter adopts two-dimensional area array photoelectric detector to measure the distribution of the two-dimensional luminance. Through installation of spectral luminous efficiency function $V(\lambda)$ optical filter and other special optical filters in front of the two-dimensional detector, two-dimensional luminance or distribution of effective radiance can be acquired, but the precision is less than that of the luminance meter and the spectral luminance meter.

The disadvantages of the existing instruments: aperture of the diagram of the luminance meter is generally large, and the aperture diameter does not relate to the size of human pupil. The measured value of the light sources with narrow light beam distribution, such as LED, would be relatively low, and the hazard of the measured light source would be underestimated. The angle of field of instrument measurement is constant, but when conducting measurements on targets on different distances, focusing will change the effective aperture of the instruments. In addition, the spectral luminance meter can only measure the average luminance and average effective radiance of a certain small area, and it cannot quickly measure the effective radiance of a certain plane. The imaging luminance meter cannot precisely measure the effective radiance of each type of light source.

SUMMARY OF THE INVENTION

The technical proposal and the proposed technical task of the invention aim to solve the abovementioned disadvantages. The invention provides a radiance measuring device with diaphragm equipped on the front focal plane of the imaging device. The size of the aperture of the diaphragm is suitable for the size of human pupil. During the measurement, the angle of field keeps constant, so that the damage to retina can be accurately evaluated. What's more, the radiance measuring device can measure under different angles of field.

The technical proposals for dealing with the problem of the prior art adopted by the invention are as follows: a radiance measuring device comprises an imaging device, a light measuring device and a connection seat for connecting the imaging device with the light measuring device. The emission port of the imaging device corresponds to the incidence port of the light measuring device. The radiance measuring device is characterized in that the imaging device comprises an imaging lens and an aperture diaphragm, and the aperture diaphragm is located on the front focal plane of the imaging lens. The aperture diaphragm could be a circular clear aperture, and to install the aperture diaphragm on the front focal plane of the imaging lens can keep the constancy of the aperture diameter of the measuring device and measuring angle of field, which will not change with measuring distance, so that the measurement accuracy is high. The aperture diaphragm could be either real or virtual. When it is real, the aperture diaphragm is a diaphragm with circular clear aperture located on the front focal plane of the imaging lens; when it is virtual, the diaphragm is imaged at the front focal point of the imaging lens by the imaging lens, which creates an effect of setting a real diaphragm at the front focal point. Certainly, the approaches to create an effect of setting a real diaphragm at the front focal point are not limited as the above two. The light measuring device could be a two-dimensional area array tester with two-dimensional detecting instrument (such as CCD and CMOS), or a spectroradiometer, or a photometer, or a combination of various light measuring devices.

As a further improvement and supplement to the above technical proposals, the invention adopts the following technical measures: the clear aperture on the aperture diaphragm is a circular one with an adjustable aperture. The aperture-adjustable circular clear aperture could be an adjustable diaphragm which can be consecutively adjusted, or a light barrier of a clear aperture with several different apertures, and the switchover of the clear apertures will change the apertures of the aperture diaphragm. The adjustability of the apertures of the aperture diaphragm is helpful to enlarge the applicable testing range, in particular to the measurement of light sources that do not produce a spatially uniform irradiance.

The clear aperture of the aperture diaphragm is a circular one with a diameter of 7 mm. The aperture diaphragm with a diameter of 7 mm simulates the maximums diameter of human pupil, which is suitable for the measurement of effective radiance of human retina, and the measurement accuracy is high; what's more, the requirement on light source is relatively low, while the measuring sensitivity is high.

The light measuring device includes a beam splitter, an image photoelectric detecting device and a spectral measuring device. The beam splitter is equipped with at least one incidence port and two emission ports. The incidence port of the beam splitter corresponds to the imaging device; the first emission port of the beam splitter corresponds to the incidence port of the spectral measuring device and the second emission port of the beam splitter corresponds to the image photoelectric detecting device. Here the image photoelectric detecting device could be a two-dimensional image photoelectric detecting device. With a two-dimensional image photoelectric detecting device and a spectral measuring device, the same area can be detected synchronously. As the measured values of the two-dimensional image photoelectric detecting device and the spectral measuring device are relevant, the measured value detected by the two-dimensional image photoelectric detecting device can be corrected in accordance with the measured value detected by the spectral measuring device, which enables the accuracy of the measuring result and improves the measurement accuracy. To measure different effective radiances such as the effective radiance of the retinal blue light hazard, the effective radiance of the retinal thermal hazard, etc, all that is needed is to apply the different measured values of the spectral measuring device to correct the value measured by the two-dimensional image photoelectric detecting device so as to ensure an accurate measuring result. The two-dimensional image photoelectric detecting device refers that the photoelectric detector thereon is the area array detector (for example, the photoelectric sensor in the digital camera), which can test the two-dimensional radiance distribution on the entire surface of the light source at one time. The usage is more convenient and fast. Based on actual needs, the spectral radiance at different wavelengths can be simultaneously measured by the spectral measuring device, which can effectively avoid the errors generated by measuring at different time and improve the measurement accuracy with convenience and fastness.

The spectral measuring device includes a light receiver and a spectroradiometer corresponding to an emission port of the light receiver. The incidence port of the light receiver corresponds to the emission ports of the beam splitter. The light receiver has one or a plurality of emission ports. The light receiver can be the integrating sphere, or the light fiber, or the light tube, or the diaphragm and of course, other device that can receive optical signal, the invention is not excluded either. The light receiver has one or a plurality of emission ports. One of the emission ports of the light receiver corresponds to the spectroradiometer; other emission ports can connect to the equipment which can be applied to the light receiver.

A light filter is installed between the beam splitter and the image photoelectric detecting device. The light filter could be a piece of filter, or a plurality of filters overlapped, or a filter wheel consisting of a plurality of filters. Different filters are arranged on the different areas of the filter wheel. The setting of the light filter is conducive to expand the test coverage of the image photoelectric detecting device.

The beam splitter is a dispersion prism on which three emission ports are installed. An alignment apparatus is mounted on the side face of which the beam splitter corresponds to the spectral measuring device. The alignment apparatus is a concave mirror reflector or a combination of the imaging lens and the plane mirror, which corresponds to the third emission port of the beam splitter. The dispersion prism (partial transmission and partial reflection) is convenient for use with high measurement accuracy. The alignment apparatus could be a concave mirror reflector or a combination of the imaging lens and the plane mirror. The two emission ports of the beam splitter which respectively correspond to the image photoelectric detecting device and the light measuring device are respectively located on the object plane and the surface of the alignment apparatus image. Moreover, after through the alignment apparatus, the relation between the object and the image of the two emission ports is one fold (which is mainly for determining the consistency of the measurement area); the setting of the alignment apparatus facilitates to indicate the overlapped areas of the measurement area of the image photoelectric detecting device and the measurement area of the spectral measuring device.

The light receiver is arranged on the position adjustment seat. The position adjustment seat could be a two-dimensional translation stage, or combination of two one-dimensional translation stages, or a one-dimensional translation stage. The position adjustment seat can translate along the plane which is parallel with the plane in which the first emission port of the beam splitter locates. Each pixel or regional spectral response of the two-dimensional photoelectric device which is on the two-dimensional image photoelectric detecting device has a possibility of disparity. However, all that is needed is to detect the data of each pixel or regional spectral response and to save the data to the computer; the invention can take the advantage of the spectral distribution data measured by the spectral measuring device to carry out the correction computation; the setting of the position adjustment seat enables to correct each pixel or regional measured value on the light input device.

The light receiver includes a ring fiber and a lighting source. The receiving end of the ring fiber includes an inner-core fiber and an episodic ring fiber; the inner-core fiber is connected with the spectroradiometer; the epibolic ring fiber is connected with the lighting source. The setting of the ring fiber is conducive to indicate the test area of the spectral measuring device. The inner-core fiber transfers the imaging information to the spectroradiometer and the epibolic ring fiber receives illumination of the lighting source; through the beam splitter and the alignment apparatus, image the epibolic ring fiber onto the image photoelectric detecting devices to determine the measurement area of the spectroradiometer.

A receiving port adjuster used for changing the size of the receiving port is arranged on the light receiver. The receiving port adjuster could be an adjustable diaphragm. The size of the receiving port of the light receiver can be changed by way of changing the aperture of the diaphragm. Or the receiving port adjuster could be an imaging lens, a concave mirror reflector and other optical element. The receiving port of the light receiver is the image formed by the actual incidence port of the light receiver via the image optical element. The size of the receiving port can be changed through changing the imaging magnification of the imaging optical element.

The invention is provided with outstanding improvements:
1. The aperture diaphragm is installed on the front focal plane of the imaging device, which is used for confining the tested field of view and the receiving aperture and improving the measurement accuracy;
2. At the same time, make use of the spectroradiometer and the two-dimensional image photoelectric detecting device for testing; the combination of the testing results can be used for calculating the effective radiance distribution of the measured object and finding out the greatest threat area of the measured light source;
3. The receiving port of the light receiver is variable; in the mean time, select the tested field of view through the selection of the pixel of the two-dimensional image photoelectric detecting device; besides, the more pixels of the two-dimensional image photoelectric detecting device, the larger the testing angle of field so that the effective radiance can be measured simultaneously with easy operation and high measurement accuracy.
4. If different optical physical quantities, such as the radiance, the chromatic value, the scotopic vision luminance, the retina effective blue light radiance, etc., are to be measured, all that is needed is to apply the relevant data sheet to calculate the tested radiance distribution figure and the spectral radiance data, which is convenient, fast and highly precise.

5. The difference of each pixel or the spectral response of the two-dimensional image surface photoelectric device can be salved by measuring the spectral response data of each pixel storing the tested data in the computer; the invention can carry out the correction computation respectively by making use of the spectral distribution data measured by the spectroradiometer and obtain high measurement accuracy.

In the Figure: 1. the imaging device, 1-1. the imaging lens, 1-2. the aperture diaphragm, 2. the light measuring device, 2-1. the beam splitter, 2-2. the image photoelectric detecting device, 2-3. the spectral measuring device, 2-31. the light receiver, 2-32. the spectroradiometer, 3. the connection seat, 3-1. the base, 3-2. the guide track, 3-3. the sliding block, 3-4 the drive screw, 4. the light filter, 5. the alignment apparatus, 6. the lighting source, 7. the receiving port adjuster.

DETAIL DESCRIPTION OF THE INVENTION

A detailed description is given below with a combination of the attached figures.

Figure 1:
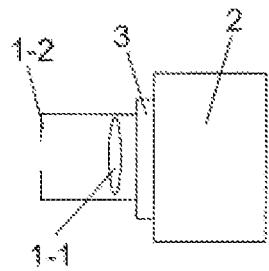
FIG. 1 is the structure schematic of the invention.

Embodiment 1: the radiance measuring device as shown in FIG. 1 includes the imaging device 1, the light measuring device 2 and the connection seat 3 for connecting the imaging device 1 with the light measuring device 2. The emission port of the imaging device 1 corresponds to the incidence port of the light measuring device 2. The imaging device 1 comprises the imaging lens 1-1 and the aperture diaphragm 1-2, and the aperture diaphragm 1-2 is located on the front focal plane of the imaging lens 1-1 (the aperture diaphragm 1-2 can be either real or virtual, which has already been described in detail in the Content of Invention, so elaboration is no need here.)

Figure 2:
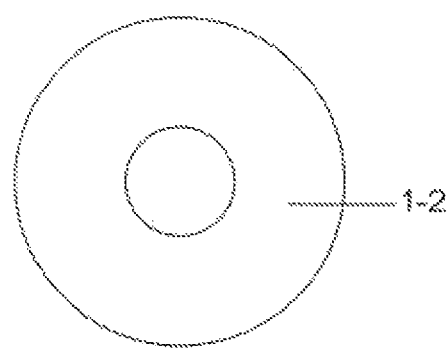
FIG. 2 is the structure schematic of the 7 mm clear aperture of the aperture diaphragm of the invention.
Figure 3:
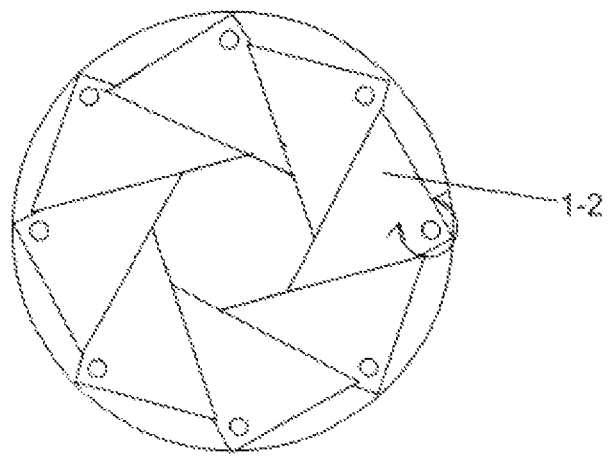
FIG. 3 is the structure schematic of the continuously adjustable clear aperture of the aperture diaphragm of the invention.
Figure 4:
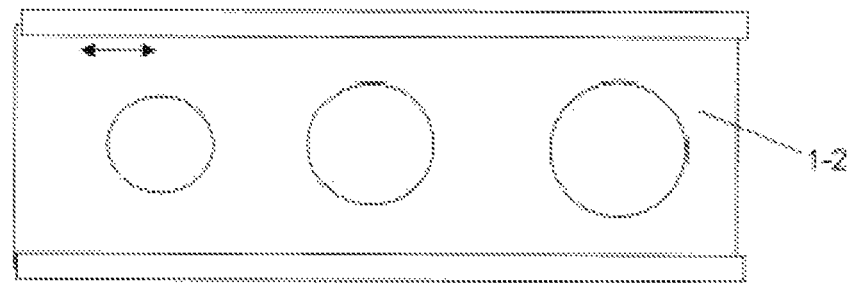
FIG. 4 is the structure schematic of the variable clear aperture of the aperture diaphragm of the invention.

When using, image the tested lighting source to the light measuring device by using the imaging device 1 and obtain the luminance, radiance and other parameters of the lighting source. The aperture diaphragm 1-2 as shown in FIG. 2 can be a 7 mm-diameter circular clear aperture, or a circular clear aperture with variable aperture; FIG. 3 is a aperture diaphragm with continuously adjustable clear aperture, or with variable clear aperture through changing the position of the dark slide, which is usually referred to as the adjustable diaphragm; or, FIG. 4 is an aperture diaphragm of variable clear aperture. A plurality of clear apertures of different apertures is arranged on a piece of light barrier; select different clear aperture by moving the light barrier and thus change the size of aperture of the clear aperture.

Figure 5:
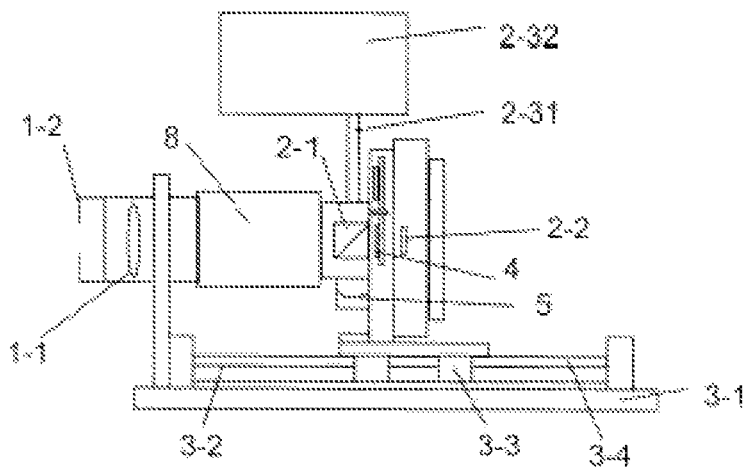
FIG. 5 is the schematic of a structure of the invention.

Embodiment 2: the radiance measuring device is as shown in FIG. 5. The light measuring device 2 includes the beam splitter 2-1, the image photoelectric detecting device 2-2 and the spectral measuring device 2-3. The beam splitter 2-1 is equipped with at least one incidence port and two emission ports. The incidence port of the beam splitter 2-1 corresponds to the imaging device 1; the first emission port of the beam splitter 2-1 corresponds to the incidence port of the spectral measuring device 2-3 and the second emission port of the beam splitter corresponds to the image photoelectric detecting device 2-2.

A light filter 4 is installed between the beam splitter 2-1 and the image photoelectric detecting device 2-2. The spectral measuring device 2-3 includes a light receiver 2-31 and a spectroradiometer 2-32 corresponding to an emission port of the light receiver 2-31. The incidence port of the light receiver 2-31 corresponds to the emission ports of the beam splitter 2-1. The light receiver 2-31 has one or a plurality of emission ports. Except for the emission port that corresponds to the spectroradiometer 2-32, other emission ports can be used to connect other possible instruments, so that the features and measurement effect of the radiance measuring device will be more perfect. The connection seat 3 in the embodiment shown in FIG. 5 includes a base 3-1, a guide track 3-2 installed on the base 3-1, a sliding block 3-3 slidably connected with the guide track 3-2 and a drive screw 3-4 installed in the base 3-1 for driving the movement of the sliding block 3-3. Either the sliding block 3-3 or the base 3-1 is fixedly connected with the imaging device 1 while the other is connected with the light measuring device 2. In other words, the light measuring device 2 is fixedly connected with the sliding block 3-3 while the imaging device 1 is fixedly connected with the base 3-1; or the light measuring device 2 is fixedly connected with the base 3-1 while the imaging device 1 is fixedly connected with the sliding block 3-3. The beam splitter 2-1 is a dispersion prism with partial transmission and partial reflection. An alignment apparatus 5 is mounted on the side face of which the beam splitter 2-1 corresponds to the spectral measuring device 2-3. In the embodiment shown in FIG. 5, the alignment apparatus 5 is a concave mirror reflector, which is just in front of the third emission port of the beam splitter 2-1. The setting of the alignment apparatus 5 is used for aligning the measurement areas of the image photoelectric detecting device 2-2 and the spectral measuring device 2-3. The light receiving port of the light receiver 2-31 is imaged to the image photoelectric detecting device 2-2 through the beam splitter 2-1 and the alignment apparatus 5 so as to determine the consistency of the measurement area. The light receiver 2-31 in the embodiment is the fiber. The image photoelectric detecting device 2-2 is a two-dimensional image photoelectric detecting device, which is usually the image photoelectric detecting device with CCD, CMOS or other area arrays. A shading device 8 is arranged between the imaging device 1 and the light measuring device 2, which can be a black sleeve or black cover for cutting off the impact of the ambient light. Other structures are the same as Embodiment 1.

When used, use the imaging device 1 to image the measured light source to the two emission ports of the beam splitter 2-1 and, at the same time, the image photoelectric detecting device 2-2 and the spectral measuring device 2-3 receive and measure the image. The measurement data of the image photoelectric detecting device 2-2 and the spectral measuring device 2-3 is input into the computer. Use the correlation of the measurement data of the image photoelectric detecting device 2-2 and the spectral measuring device 2-3 to calculate the luminance, radiance and other parameters.

Figure 6:
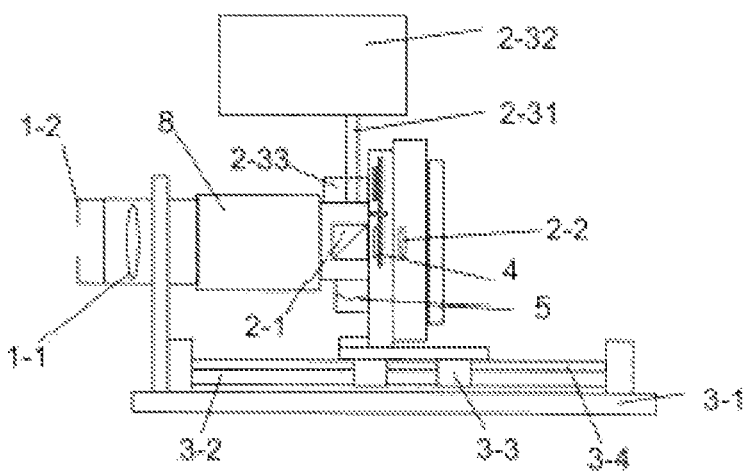
FIG. 6 is the schematic of a structure of the invention.

Embodiment 3: the radiance measuring device is as shown in FIG. 6. The light receiver 2-31 is arranged on the position adjustment seat 2-33, which is a two-dimensional translation stage in the embodiment. (Again, the possible structures of this part have been described in details in the Content of Invention and will not be elaborated here.) Other structures are the same as Embodiment 2.

Figure 7:
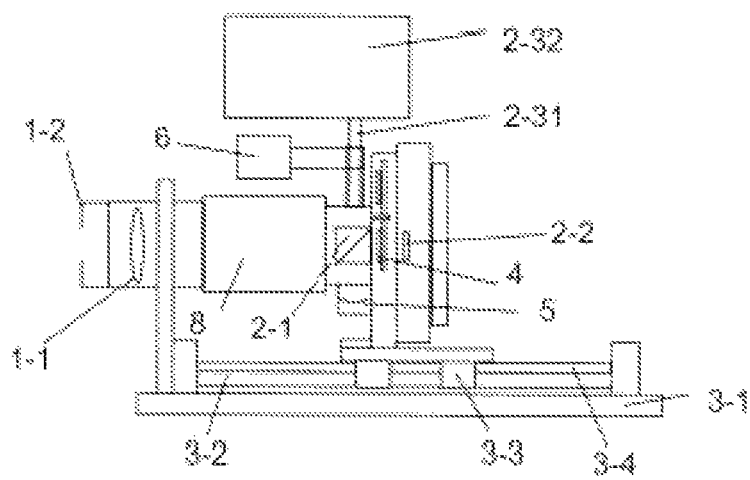
FIG. 7 is the schematic of a structure of the invention.

Embodiment 4 the radiance measuring device is as shown in FIG. 7. The light receiver 2-31 includes a ring fiber and a lighting source 6, wherein the receiving end of the ring fiber consists of the inner-core fiber and epibolic ring fiber. The inner-core fiber is connected with the spectroradiometer 2-32 while the epibolic ring fiber is connected with the lighting source 6. Other structures are the same as Embodiment 2.

Figure 8:
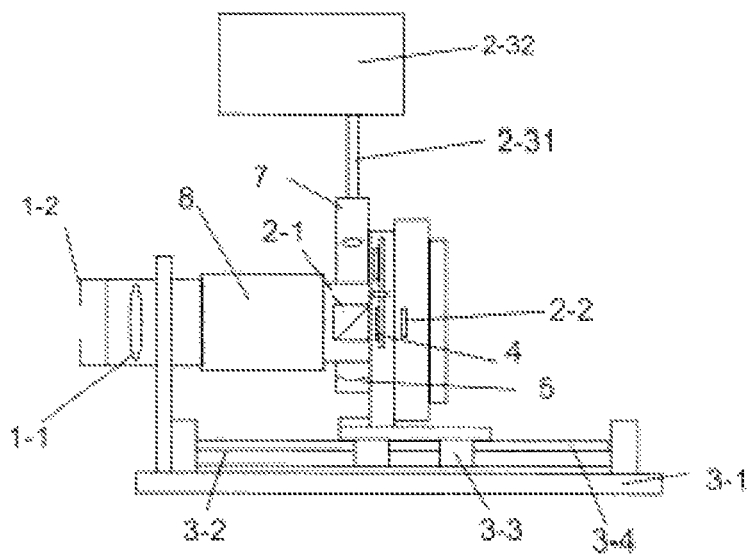
FIG. 8 is the schematic of a structure of the invention.

Embodiment 5 The radiance measuring device is as shown in FIG. 8. The light receiver 2-31 is equipped with a receiving port adjuster 7 to regulate the size of the receiving port. The receiving port of the light receiver is the image formed by the actual incidence port of the light receiver through the imaging optical element (i.e. the receiving port adjuster 7). The size of the receiving port is altered by adjusting the imaging magnification of the imaging optical element so that the size of the receiving port that has actual effect can adapt to the test demand and correspond to the appropriate test area of the image photoelectric detecting device. The receiving port adjuster in the embodiment is a tube with an imaging lens. The receiving port of the fiber is imaged by the receiving port adjuster 7 on the emission port of the beam splitter 2-1. Other structures are the same as Embodiment 2.

What is claimed is:

1. A radiance measuring device comprising an imaging device (1), a light measuring device (2) and a connection seat (3) for connecting the imaging device (1) with the light measuring device (2);
   an emission port of the imaging device (1) corresponding to an incidence port of the light measuring device (2);
   the imaging device (1) comprising an imaging lens (1-1) and an aperture diaphragm (1-2) located on a front focal plane of the imaging lens (1-1).

2. The radiance measuring device as set forth in claim 1, wherein a clear aperture on the aperture diaphragm (1-2) is a circular one with an adjustable aperture.

3. The radiance measuring device as set forth in claim 1, wherein the clear aperture of the aperture diaphragm (1-2) is a circular one with a diameter of 7 mm.

4. The radiance measuring device as set forth in claim 1 or 2 or 3, wherein the light measuring device (2) includes a beam splitter (2-1), an image photoelectric detecting device (2-2) and a spectral measuring device (2-3); the beam splitter (2-1) is equipped with at least one incidence port and two emission ports, the incidence port of the beam splitter (2-1) corresponds to the imaging device (1); a first emission port of the beam splitter (2-1) corresponds to an incidence port of the spectral measuring device (2-3) and a second emission port of the beam splitter corresponds to the image photoelectric detecting device (2-2).

5. The radiance measuring device as set forth in claim 4, wherein the spectral measuring device (2-3) includes a light receiver (2-31) and a spectroradiometer (2-32) corresponding to an emission port of the light receiver (2-31), an incidence port of the light receiver (2-31) corresponds to the emission ports of the beam splitter (2-1), the light receiver (2-31) has one or a plurality of emission ports.

6. The radiance measuring device as set forth in claim 5, wherein the light receiver (2-31) is installed on a position adjustment seat (2-33).

7. The radiance measuring device as set forth in claim 5, wherein the light receiver (2-31) includes a ring fiber means and a lighting source (6), a receiving end of the ring fiber means includes an inner-core fibers and an epibolic ring fibers; the inner-core fibers are connected with the spectroradiometer (2-32); the epibolic ring fibers are connected with the lighting source (6).

8. The radiance measuring device as set forth in claim 5, wherein a receiving port adjuster (7) used for changing the size of the receiving port of the light receiver (2-31) is arranged on the light receiver (2-31).

9. The radiance measuring device as set forth in claim 4, wherein a light filter (4) is installed between the beam splitter (2-1) and the image photoelectric detecting device (2-2).

10. The radiance measuring device as set forth in claim 4, wherein the beam splitter (2-1) is a dispersion prism with three emission ports installed, an alignment apparatus (5) is mounted on a side of the beam splitter (2-1) facing to the spectral measuring device (2-3), the alignment apparatus (5) is a concave mirror reflector or a combination of a imaging lens and a plane mirror, which corresponds to a third emission port of the beam splitter (2-1).

* * * * *